Dec. 21, 1954 A. W. FRIEND 2,697,755

MAGNETIC RECORD SYSTEM

Filed Oct. 31, 1950

INVENTOR
ALBERT W. FRIEND
BY Morris A. Rabkin
ATTORNEY

United States Patent Office 2,697,755

Patented Dec. 21, 1954

2,697,755

MAGNETIC RECORD SYSTEM

Albert W. Friend, Princeton, N. J., assignor to Radio Corporation of America, a corporation of Delaware Application October 31, 1950, Serial No. 193,203

2 Claims. (Cl. 179—100.2)

Figure 1:
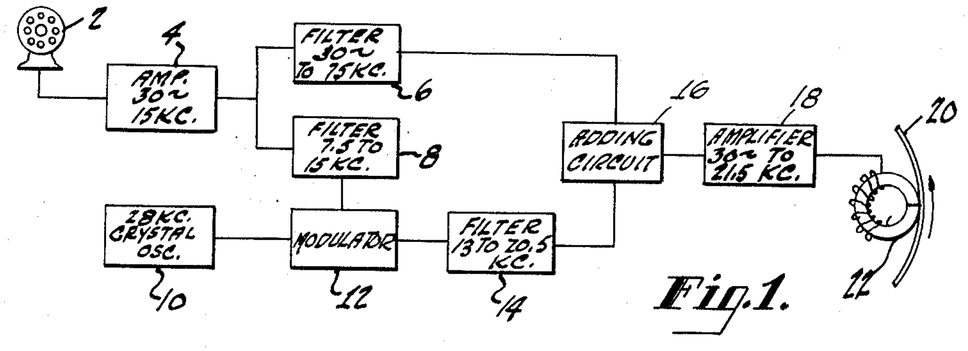

This invention relates to magnetic recording and reproducing systems, and more particularly to improved means for and methods of increasing the amount of information that may be recorded on or reproduced from a given length of tape at a given speed of tape movement.

Heretofore, problems have arisen in the art of magnetic recording which necessitated a choice, in particular instances, between high fidelity recording and large amounts of tape, or reduced amounts of tape, because of space limitations, coupled with a reduction in the fidelity of the recording. This problem arises because of the inherent frequency response characteristics of the transducers used in the recording or reproducing processes. When signals are recorded longitudinally of the sound track on the moving tape, as is now the common practice, for any given tape speed a single cycle of a particular frequency produces a corresponding magnetic impression of a particular length on the sound track. As is well known in the art, the transducers, which convert these magnetic impressions into electrical energy which is, in turn, converted into sound waves corresponding to the original sound recorded on the tape, comprise magnetic core members having very small, non-magnetic gaps across which the magnetic impressions on the tape act. When the length of one full wave of the magnetic impression on the tape approaches the size of the width of the gap, the signal is considerably reduced. The output signal is zero when the wavelength of the magnetic impression is the same size as the width of the gap. The width of the gap should be understood as the distance between opposed pole faces of core members.

In practice, there are two linear speeds at which the tape is ordinarily driven past the transducer. One of these is 7.5 inches per second and the other is 15 inches per second. At the slower of these two speeds, the null frequency (i. e., the frequency at which the wavelength of the magnetic impression is equal to the gap width) occurs at about 12,500 cycles per second, which is within the audible range. However, the practical upper limit is reached at about 8,000 cycles per second. The normal range of audible frequencies is usually considered to run from 30 to 15,000 cycles per second. Thus it may be seen that about one-half of the useful frequencies are lost, reducing the fidelity of the recorded and reproduced signal.

When the tape is driven at 15 inches per second, the band of useful frequencies extends up to about 15,000 cycles per second. However, at the higher speed, twice as much tape must be used to record information having the same time length as compared with tape driven at the lower speed. This substantially increases the cost and the space requirements which is, of course, an objectionable feature.

It is known that when the null frequency is exceeded, the transducer again responds to the impressed signal until a second null frequency is reached. The cycle is repetitive with nulls occurring substantially at integral multiples of the first null frequency. Domains of useful response occur between each pair of adjacent nulls. Domain, as used in this specification and the appended claims means the range of useful frequencies between each pair of adjacent nulls on the frequency response characteristic curve.

It is the primary object of the present invention to provide an improved method of and means for increasing the amount of useful information that may be stored on a given length of magnetic record.

Another object of the present invention is the provision of improved means for and method of increasing the fidelity of magnetic recordings using magnetic records which are driven at relatively low linear speeds.

In accomplishing these and other objects, use is made of the domains above the first null frequency. For example, in improving the quality or fidelity of the record on tape driven at a low speed, the audio frequency spectrum is divided, in a filter network, into a lower band and an upper band, the division, on tapes driven at 7.5 inches per second, occurring at about 7,500 cycles per second. The lower band is recorded directly on the tape or other record medium. A higher, fixed frequency signal is modulated by the upper band. This produces a shift in the frequency of the upper band to a range that fits into the useful portion of one of the domains beyond the first null frequency, such domains beyond the first null frequency hereinafter being denoted as higher order domains. The shifted upper band is then added to the lower band signal and the two bands are recorded simultaneously on the same sound track. In the reproduction of the recorded signal, the transducer picks up both bands; the bands are separated in a filter network; the upper band is demodulated and fed to a loudspeaker. The lower band may be fed either to the same loudspeaker as the upper band or to a separate speaker.

Figure 2:
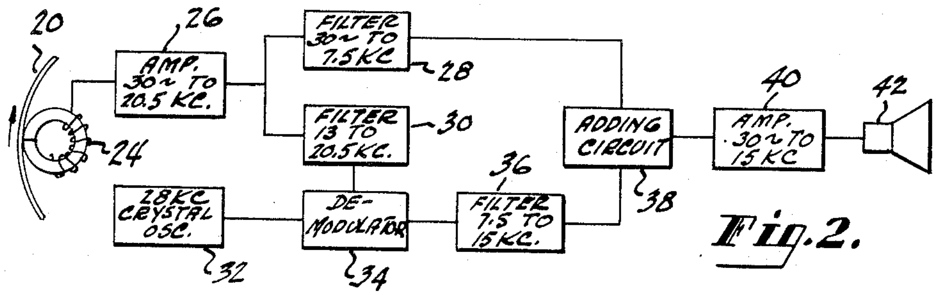
Figure 3:
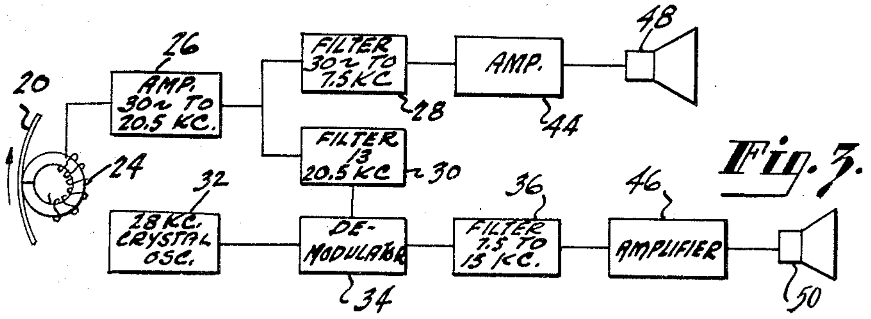
Figure 4:
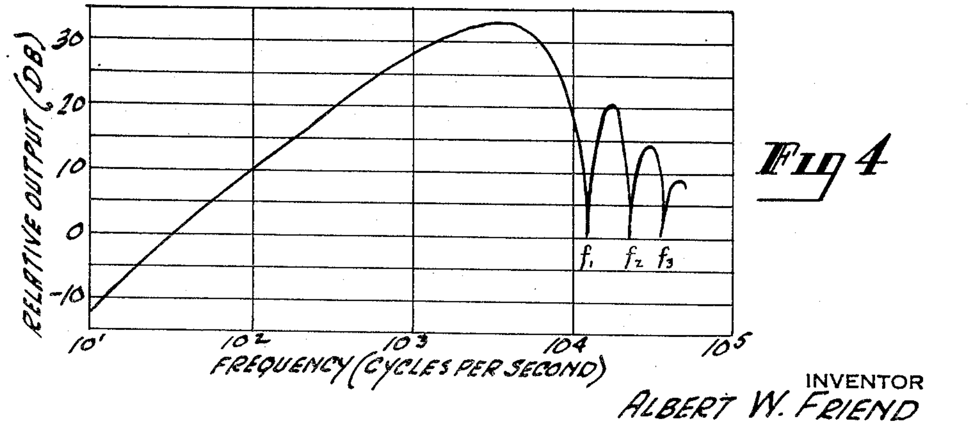

A better understanding of the present invention may be had from the following detailed description when read in connection with the accompanying drawing wherein:

Figure 1 is a schematic diagram of a circuit arrangement for recording in accordance with the present invention, Figures 2 and 3 are schematic diagrams of alternative circuit arrangements for reproducing a signal recorded by the system shown in Figure 1, and Figure 4 is a graph showing a typical transducer response characteristic curve for a tape speed of 7.5 inches per second.

Since the system for improving the fidelity of signals recorded on tape driven at the low speed of 7.5 inches per second is representative of the invention, the invention will be particularly described as applied to that system.

In Figure 4, there is shown a graph of the response of transducers having a gap-width of about .0006″ to magnetic impressions on a tape moving at 7.5 inches per second. It will be noted that the first null frequency $f_1$ occurs at 12,500 cycles per second, the second $f_2$ at 25,000, and the third $f_3$ at 37,500. Thus, there is produced a series of lobes or domains of successively higher orders, each being about 12,500 cycles per second in width. However, in practice it has been found that the upper useful limit of the first lobe or domain is about 8,000 cycles per second. Similarly, the useful range of the lobes beyond the first null is limited to a band width of about 8,000 cycles per second.

It may also be seen from the graph that, if a series of sounds (a musical selection, for example) were to be recorded in the normal manner, sounds of certain frequencies would not appear in the reproduced sound. Since most of our sounds, particularly in music, are composed of very complex waves, including the fundamental frequency as well as many overtones, a gap in the frequency response of the reproducing apparatus would result in considerable distortion of the original sounds in the reproduction.

In Figure 1, there is shown a system for recording sounds according to the present invention which records the full range of audible frequencies, while permitting the economy of the lower tape speeds. In this system, there is provided a signal pick-up device, here shown as a microphone 2, the output of which is fed to an amplifier 4. The output of the amplifier 4 is divided in a pair of filter networks 6 and 8. The low-pass filter 6 passes those frequencies in the range from 30 cycles per second to 7,500 cycles per second. The high-pass filter 8 passes the upper range of audible frequencies from 7,500 to 15,000 cycles per second. There is also an oscillator 10, preferably crystal controlled, the fundamental frequency of which is 28,000 cycles per second. The output of the oscillator 10 is beaten with the upper band of frequencies passed by the filter 8 in a heterodyne modulator circuit 12. There will thus be produced a lower side band of beat frequency oscillations in the range from 13,000 to 20,500 cycles per second. Oscillations other than this lower side band are eliminated in a third filter network 14. Thus, the upper band of audible frequencies has been, in effect, shifted from the range of 7,500–15,000 cycles per second to the range of 13,000–20,500 cycles per second. That is, the signal band has been shifted from a position astride the first null frequency to a position entirely within the useful portion of the second order domain.

The signals of the lower sideband beat frequency oscillations are then superimposed on the signals of the lower band of audible frequencies in a simple, linear, adding circuit 16. By making the adding circuit 16 linear, cross-modulations between the two signals is avoided, leaving two separate and distinct but superimposed signals. The resultant mixed signal is then amplified in a suitable circuit 18 and applied to a magnetic record tape 20 through a magnetic recording transducer 22.

To reproduce the original signal from the record on the above tape, a somewhat similar process is involved, as illustrated in Figures 2 and 3. A playback transducer 24 picks up the signals from the tape 20. (It should be noted that there are no "dead spots" in the response of the transducer to the signals on the tape because there are no signals recorded which lie in the null range.) The picked-up signals are then fed to an amplifier 26 whence they are again divided in a pair of filter networks 28, 30. The low-pass filter 28 passes only the signals recorded in the first order domain, viz., those signals from 30 to 7,500 cycles per second, while the high-pass filter 30 passes only those signals recorded in the second order domain, i. e., those signals from 13,000 to 20,500 cycles per second. Again, there is provided an oscillator 32, preferably crystal controlled, the fundamental frequency of which is 28,000 cycles per second, or the same frequency as the oscillator in the recording system. The output of the high-pass filter is shifted to its original range, from 7,500 to 15,000 cycles per second, by beating it against the oscillator output in a suitable heterodyne demodulator 34. The output of the demodulator is freed from unwanted harmonics by a suitable filter network 36 which passes only those frequencies in the range from 7,500 to 15,000 cycles per second.

The signals of the reconstructed upper audible band may, as shown in Figure 2, be recombined with the signals of the upper band in an adding circuit 38 similar to that shown in the recording system. The recombined signals are then amplified in an appropriate amplifier 40 and fed to a loudspeaker 42 where the original sounds are reproduced.

Alternatively, as shown in Figure 3, the two bands of audible frequencies may be amplified in separate amplifiers 44 and 46 and fed to separate loudspeakers 48 and 50, the lower band being fed to a low frequency speaker, or so-called "woofer" 48, and the upper band to a high frequency speaker or "tweeter" 50. In this manner, the two frequency bands are recombined as sound waves in the air and the complete original sound thus reconstructed.

Similarly, the method of the present invention may be equally applicable as a means of recording separate sequences of information on the same sound track without interfering with each other. These separate sequences of information may be recorded simultaneously or sequentially. This latter application of the method of the present invention is not restricted to a particular tape speed but rather may be employed with records driven at any selected speed. However, it must be kept in mind that the local oscillator, the output of which is beaten with those signals which are to be shifted, must oscillate at a frequency such as will produce a range of beats within the usable portion of the selected higher order domain, whether that selected domain be of the second, third or higher order. Of course, the null frequencies, being a function of the width of the gap in the transducer and of the linear speed of the tape, will vary with changes in either or both. Consequently, the frequency at which the local oscillator operates depends, first, upon these physical parameters of the system, second, upon the frequency range of the signals to be shifted, and third, upon the frequency range to which those signals are to be shifted (i. e., the range within one of the higher order domains).

The method may be applied to this latter utilization in either of two ways. First, two or more selections may be recorded simultaneously on the tape. One of these may be recorded directly as in the lower band of audible frequencies set forth above. The other selections would have their frequency range shifted to higher order domains through the heterodyne process described in connection with the higher band of audible frequencies. Second, two or more selections may be recorded sequentially, but superimposed on the tape. Again, one of the selections would be recorded directly while the others would be shifted to successively higher order domains.

In reproducing the original signals from the records on the tape, suitable switching means may be provided whereby the particular one of the selections desired will be reproduced.

It should now be apparent that there has been provided an improved means and method of recording information as magnetic signals on a record tape wherein an increased amount of information, either in the form of a broader frequency response or in the form of separate series of signals, may be recorded on a single sound track of given length.

What is claimed is:

1. In apparatus for recording signals as magnetic impressions on a magnetizable record member with the aid of a signal translating device, the frequency response characteristic of the system including a succession of lobes separated by a succession of nulls, said nulls occurring when, at the selected linear speed of the record member; the gap in the translating device defines a length substantially equal to an integral number of wavelengths of the signal to be recorded, the combination comprising means for obtaining an electrical current corresponding to the signals to be recorded, means for dividing said current into a plurality of frequency bands of a bandwidth less than the bandwidth of said lobes, modulating means for shifting the frequency range of all but the lowest of said bands whereby each of said bands lies entirely within a separate one of said lobes, means for superimposing the current in the frequency shifted bands upon the current in the lowest band, and means for converting the resultant combined current into corresponding magnetic impressions on a magnetizable record member.

2. In apparatus for recording signals as magnetic impressions on a magnetizable record member and for reproducing the signals from such a record with the aid of signal translating means, the frequency response characteristic of the system including a succession of lobes separated by a succession of nulls, said nulls occurring when, at the selected linear speed of the record member; the gap in the translating device defines a length substantially equal to an integral number of wavelengths of the signal to be recorded, the combination comprising means for obtaining an electrical current corresponding to the signals to be recorded, means for dividing said current into a plurality of frequency bands of a bandwidth less than the bandwidth of said lobes, modulating means for shifting the frequency range of all but the lowest of said bands whereby each of said bands lies entirely within a separate one of said lobes, means for superimposing the current in the frequency shifted bands upon the current in the lowest band, means for converting the resultant combined current into corresponding magnetic impressions on a magnetizable record member, means for reconverting said magnetic impressions into an electrical current corresponding to said magnetic impressions, means for separating said current into frequency bands corresponding to said separate lobes, demodulating means for shifting the frequency range of the current falling within lobes beyond the first null to the frequency range of the signals represented thereby, and signal translating means obtaining signals corresponding to the said reconverted current.

References Cited in the file of this patent

FOREIGN PATENTS

| Number | Country | Date |
|---|---|---|
| 621,263 | Germany | Nov. 4, 1935 |
| 624,638 | Great Britain | June 14, 1949 |
| 829,965 | France | May 2, 1935 |